United States Patent [19]

Lalk et al.

[11] 4,151,341
[45] Apr. 24, 1979

[54] NOVEL POLYMERS AND POLYMERIC SALTS

[75] Inventors: Robert H. Lalk; Syamalarao Evani, both of Midland, Mich.

[73] Assignee: The Dow Chemical Company, Midland, Mich.

[21] Appl. No.: 893,645

[22] Filed: Apr. 5, 1978

[51] Int. Cl.² ............... C08F 212/04; C08F 216/14; C08F 220/06; C08F 222/06
[52] U.S. Cl. ............... 260/29.6 RW; 260/29.6 TA; 260/42; 260/42.21; 260/42.57; 526/303; 526/317; 526/318; 526/271
[58] Field of Search ............... 526/318, 271, 303, 317; 260/29.6 RW, 29.6 TA, 47 UA, 42, 42.57, 42.21

[56] References Cited

U.S. PATENT DOCUMENTS

| | | | |
|---|---|---|---|
| 3,190,925 | 6/1965 | Stowe | 260/611 |
| 3,342,787 | 9/1967 | Muskat | 526/272 |
| 3,392,155 | 7/1968 | Muskat | 526/272 |
| 3,436,378 | 4/1969 | Azorlosa et al. | 526/271 |
| 3,794,608 | 2/1974 | Evani et al. | 260/29.6 RW |
| 4,008,202 | 2/1977 | Evani et al. | 260/47 UA |
| 4,025,484 | 5/1977 | Evani et al. | 260/33.6 UA |

Primary Examiner—John Kight, III
Attorney, Agent, or Firm—James B. Guffey

[57] ABSTRACT

Novel low molecular weight interpolymers containing pendant lower alkyl capped poly(oxyethylene)ether groups are effective as aqueous dispersing agents for particulate matter and are particularly effective for difficult-to-disperse, finely divided inorganic solids such as precipitated calcium carbonate and satin white. The interpolymers comprise, in polymerized form, (1) an alkenyl benzyl ether of an ethoxylated lower alkane compound, which ether has the formula:

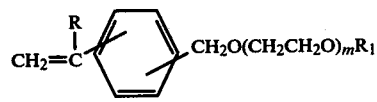

(wherein R is hydrogen or methyl, $R_1$ is lower alkyl and m is a positive integer greater than 1) with (2) a copolymerizable ethylenically unsaturated acid such as acrylic acid, methacrylic acid, etc., or a copolymerizable ethylenically unsaturated dicarboxylic anhydride such as maleic anhydride and (3) a hydrophobic monomer such as styrene.

12 Claims, No Drawings

NOVEL POLYMERS AND POLYMERIC SALTS

BACKGROUND OF THE INVENTION

This invention relates to low molecular weight interpolymers of a hydrophobic monomer, an ethylenically unsaturated carboxylic acid monomer or an ethylenically unsaturated dicarboxylic anhydride monomer and an alkenyl benzyl ether monomer, to water-soluble salts of such interpolymers, and to the use of such interpolymers and salts as dispersing agents for aqueous dispersions.

The dispersing of particulate matter in an aqueous medium has always presented the problem of obtaining suitable stability and flow characteristics for the various types of aqueous dispersions and for the various practical applications in which such dispersions are desirably employed. Accordingly, much effort has been expended in developing suitable aqueous dispersing agents for various purposes as is evidenced, for example, by the extensive collection of surfactant information summarized in *McCutcheon's Detergents and Emulsifiers*, North American Edition, 1973 Annual.

In spite of the extensive efforts of the prior art, many of the known dispersing agents are not suitable for many purposes, for example, by virtue of requiring high dispersing agent concentrations, by virtue of incompatibility with various coating composition ingredients, by virtue of limited storage stability of the resulting dispersions, etc. Moreover, there are certain particulate solids (notably certain especially difficult-to-disperse, finely divided inorganic pigments such as precipitated calcium carbonate and satin white and especially the high solids dispersions thereof) for which fully satisfactory dispersing agents have heretofore not been available.

In view of the foregoing deficiencies of the prior art, it is desirable to provide improved dispersing agents which are suitable for preparing aqueous dispersions of finely divided particulate matter (especially for high solids aqueous dispersions and particularly for high solids aqueous dispersions of finely divided inorganic solids such as precipitated calcium carbonate and satin white). Moreover, it is especially desirable to provide improved dispersing agents which furnish dispersions having improved storage stability and also which exhibit improved compatibility with aqueous polymer latexes such as those employed as film-forming components of coating compositions.

SUMMARY OF THE INVENTION

This invention is such an improved dispersing agent and constitutes a novel class of low molecular weight interpolymers which are at least inherently water-dispersible and which comprise, in polymerized form, (1) a hydrophobic monomer, (2) a copolymerizable ethylenically unsaturated carboxylic acid monomer or a copolymerizable ethylenically unsaturated dicarboxylic anhydride monomer and (3) an alkenyl benzyl ether monomer of the formula:

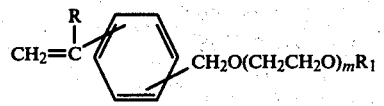

I wherein R is hydrogen or methyl, $R_1$ is a lower alkyl group and m is a positive integer greater than 1.

As used herein, the phrase "at least inherently water-dispersible" means that the polymer is either water-soluble or is inherently water-dispersible (i.e., dispersible in water without the use of a separate dispersing agent).

The aforementioned polymers of the invention (and/or the water-soluble salts thereof) are useful as dispersing agents (e.g., dispersants, protective colloids, etc.), particularly for stable high solids aqueous dispersions of finely divided organic or inorganic particulate matter. Such polymers are especially beneficial in the preparation of exceptionally stable high solids aqueous dispersions of finely divided inorganic pigments such as satin white and precipitated calcium carbonate.

DETAILED DESCRIPTION OF THE INVENTION

The interpolymers of the invention contain pendant lower alkyl-capped poly(oxyethylene)ether groups derived from an alkenyl benzyl ether monomer represented by the Formula I above. The alkenyl benzyl ether monomers of the Formula I are diethers of polyethylene glycols wherein one etherifying moiety is an alkenyl benzyl moiety and the other etherifying moiety is a lower alkyl group. Such alkenyl benzyl ether monomers are known compounds which are conveniently prepared, pursuant to the procedure described in U.S. Pat. No. 3,190,925, by reacting an alkenyl benzyl halide (e.g., vinyl benzyl chloride, isopropenyl benzyl chloride, etc.) with a monolower alkyl ether of polyethylene glycol having "m" oxyethylene repeating units.

Advantageously, the number of oxyethylene units (i.e., the integer m) in the alkenyl benzyl ether of the Formula I is from about 10 to about 100, preferably from about 10 to about 80, more preferably from about 10 to about 40, and most preferably from about 20 to about 40. In addition, it is important that the $R_1$ group of the alkenyl benzyl ether monomer of the Formula I be a lower alkyl group (i.e., an alkyl group contaning from 1 to about 6 carbon atoms such as methyl, ethyl, isopropyl, sec-butyl, n-pentyl, n-hexyl, etc.). Preferably such $R_1$ group is methyl or ethyl (especially methyl).

The minimum amount of the aforementioned alkenyl benzyl ether monomer advantageously employed in the interpolymers of the invention is an amount sufficient to provide at least one equivalent of the pendant lower alkyl capped poly(oxyethylene) group per mole of the polymer (i.e., an average of one such pendant group per polymer molecule). Naturally, larger amounts of the alkenyl benzyl ether monomer can be employed, if desired, to provide an average of more than one such pendant group per polymer molecule. Accordingly, the quantitative amount (e.g., in terms of mole percent) of such monomer which is employed in a given instance depends upon such factors as the molecular weight desired for the final interpolymer product, the number of pendant groups desired per molecule, etc. However, as a general rule, from about 1 to about 25 (preferably from about 5 to about 25) mole percent of such monomer is employed based upon total moles of various monomeric components.

A second type of monomer employed in the preparation of the interpolymers of the invention is a copolymerizable ethylenically unsaturated carboxylic acid or anhydride. Suitable unsaturated carboxylic acids for use herein thus include acrylic acid, methacrylic acid, maleic acid, fumaric acid, half esters or half amides of maleic or fumaric acid, and the like. Suitable unsaturated anhydrides include, for example, maleic anhydride, chloromaleic anhydride, methyl maleic anhydride, phenyl maleic anhydride, and similar ethylenically unsaturated dicarboxylic anhydrides. Naturally, mixtures of two or more of such monomers can also be employed.

The aforementioned ethylenically unsaturated carboxylic acid or anhydride monomer is employed in an amount sufficient to render the resulting interpolymer inherently water-dispersible and such amount of quantitative terms naturally depends upon such factors as the identity of the particular monomers involved, the molecular weight of the resulting interpolymer, etc. However, as a general rule, from about 20 to about 60 (preferably from about 30 to about 50) mole percent of such monomer is employed based upon the total moles of the various monomeric components.

The third type of monomer employed in the interpolymers of the invention is a hydrophobic monomer (i.e., a copolymerizable monomer which in the form of a homopolymer is water-insoluble). Suitable copolymerizable hydrophobic monomers include monovinylidene aromatic monomers (e.g., styrene, amethyl-styrene, vinyl toluene, etc.); $\alpha$-olefin monomers (e.g., ethylene, propylene, etc.); alkyl diesters of ethylenically unsaturated dicarboxylic acids (e.g., diethyl maleate, dibutyl fumarate, etc.); vinyl ethers (e.g., vinyl butyl ether, vinyl hexyl ether, etc.); vinyl esters (e.g., vinyl acetate, vinyl benzoate, etc.); alkyl esters of ethylenically unsaturated monocarboxylic acids (e.g., ethyl acrylate, methyl methacrylate, cyclohexyl acrylate, 2-ethylhexyl methacrylate, etc.) and similar hydrophobic monomers. Preferably, the hydrophobic monomer is a monovinylidene aromatic monomer such as styrene; substituted styrene such as ar-halostyrene or ar-alkylstyrene (e.g., t-butyl styrene, vinyl toluene, etc.); vinylnaphthalene; substituted vinylnaphthalene such as halogen substituted vinylnaphthalene or alkyl substituted vinylnaphthalene; and the like. Naturally, any desired mixture of two or more of the aforementioned hydrophobic monomers also can be used.

The amount of the aforementioned hydrophobic monomer employed in the practice of the invention is not particularly critical. However, as a general rule, from about 25 to about 75 (preferably from about 30 to about 60) mole percent of such monomer is employed on a total mole basis.

The molecular weight of the interpolymer of the invention is not particularly critical so long as it is sufficiently low to allow use of such interpolymers in amounts sufficient to provide aqueous dispersions of the desired stability without, at the same time, imparting undesired viscosity increases thereto. Typically, such objective is suitably obtained with interpolymers of the invention having weight averaged molecular weights in the range of from about 1,000 to about 10,000 (preferably from about 1,000 to about 5,000) as determined by conventional absolute molecular weight measurement techniques such as light scattering or by conventional indirect techniques such as intrinsic viscosity or inherent viscosity determinations.

The low molecular weight interpolymers of the invention can be prepared pursuant to conventional polymerization procedures and the desired low molecular weight can be achieved by conventional techniques such as by the use of chain growth regulating agents (i.e., chain transfer agents) such as mercaptans, by the use of relatively high catalyst levels or by the use of relatively high polymerization temperatures. U.S. Pat. Nos. 3,085,994, 3,451,979 and 4,025,484 describe various conventional procedures which may be used. Preferably, however, the low molecular weight interpolymers of the invention are prepared pursuant to an improved process wherein the, otherwise conventional, solution polymerization is conducted in the presence of the hydroxide or a nucleophilic salt of a monovalent cation (e.g., in the presence of sodium hydroxide, lithium chloride, etc.). Such improved process is fully described in copending U.S. application Ser. No. 849,281 and the disclosure of such application is hereby incorporated by reference.

The interpolymers of the invention are useful as dispersants and/or as protective colloids in a wide variety of aqueous dispersions. Beneficially, in such capacity, the interpolymer is converted to a salt form by reaction with a base to a pH of from about 7 to about 10 (preferably from about 7 to about 9) prior to addition to the dispersion. Most preferably, such salt form is achieved by neutralization with such base to a pH of about 7. Suitable bases for such salt conversion include ammonia, alkali metal bases, alkyl amines, and the like.

The aforementioned interpolymers (or the salts thereof) are particularly useful in the preparation of high solids aqueous dispersions of finely divided inorganic particulate solids, especially those particulate solids which are extremely difficult to disperse such as precipitated calcium carbonate and satin white. Other solids effectively dispersed by the interpolymers of this invention, even in high solids dispersions thereof, include carbon black, $TiO_2$, $ZnO_2$, $SiO_2$, barium carbonate as well as other organic or inorganic pigments, extenders, fillers, etc. In addition, the interpolymers of the invention are also useful as protective colloids in dispersions (e.g., aqueous emulsions, latexes, etc.) of natural or synthetic polymers such as, for example, those (e.g., copolymers of styrene and butadiene, polyvinyl acetate homopolymers and copolymers of esters of acrylic and/or methacrylic acid, etc.) which are conventionally employed as film-forming components of aqueous emulsion coating compositions. Accordingly, the interpolymers of the invention are especially advantageous when employed as dispersing agents in pigmented, extended or filled aqueous emulsion coating compositions which comprise both the aforementioned particulate solids (e.g., pigments, extenders, fillers, etc.) and dispersed film-forming binder particles (e.g., the aforementioned natural or synthetic polymer latexes) inasmuch as such interpolymer then serves both as a dispersant for the former component (i.e., the filler, binder, pigment, etc.) and as a protective colloid for the latter component (i.e., the dispersed film-forming polymer particles).

The solids content of the aforementioned aqueous dispersions (e.g., pigment dispersions, polymer emulsions, coating compositions, etc.) can vary considerably depending on the end use, the nature of the dispersed solids, etc. Accordingly, there is no intent to limit the use of the interpolymers of the invention to any particular solids content range. As a general rule, however, such dispersions contain from about 20 to about 80 weight percent of dispersed solids, on a total weight basis, and the interpolymers of the invention are particularly advantageous for high solids dispersions such as those containing from about 50 to about 80 weight percent solids on a total weight basis.

The interpolymers of the invention are employed in the aforementioned aqueous dispersions in the conventional manner and in an amount sufficient to stabilize the dispersion. Usually, the interpolymer content suitable for such purpose ranges from about 0.05 to about 2 percent, preferably about 0.1 to about 0.75 percent based on the weight of dispersed solids.

The following nonlimiting examples will further illustrate the invention. All parts and percentages are by weight unless otherwise specified.

EXAMPLES 1-3

A series of alkenyl benzyl ether monomers of the Formula I and having the values for R, $R_1$ and m as designated below are prepared pursuant to the procedure of U.S. Pat. No. 3,190,925 by reacting vinylbenzyl chloride with the appropriate mono-ether (i.e., the monomethyl ether or the mononoylphenyl ether) of the appropriate (i.e., m has an average value of 1, 10, 40 or 100) ethylene glycol.

$$CH_2=C(R)-C_6H_4-CH_2O(CH_2CH_2O)_mR_1 \quad \text{I}$$

| Alkenyl benzyl Ether Monomer | R | $R_1$ | M |
|---|---|---|---|
| VBE 1 | H | $CH_3$ | 10 |
| VBE 2 | H | $CH_3$ | 40 |
| VBE 3 | H | $CH_3$ | 100 |
| VBE 4 | H | nonylphenyl | 40 |
| VBE 5 | H | $CH_3$ | 1 |

Employing those alkenyl benzyl ether monomers, a series of low molecular weight terpolymers of such monomers with styrene and maleic anhydride are prepared employing the following solution polymerization recipe and pursuant to the improved polymerization procedure of copending U.S. application Ser. No. 849,281.

| MATERIAL | Recipe |
|---|---|
| Monomers | Amount |
| Styrene | 40 mole percent[1] |
| Maleic anhydride | 50 mole percent[1] |
| Vinylbenzyl ether[2] | 10 mole percent[1] |
| Catalyst | |
| Azobis isobutyronitrile | ~0.5 wt. % based upon styrene and maleic anhydride |
| Molecular Weight Control Additive | |
| Lithium chloride | 2,000 parts per million by weight based upon styrene and maleic anhydride |
| Solvent | |
| Methyl ethyl ketone (MEK) | 50 wt. % based on combined monomer |

[1] Based upon total moles of monomer charge.
[2] Either VBE 1, VBE 2, VBE 3, VBE 4, or VBE 5 as designated for individual polymers below.

Briefly, the polymerization procedure employed is as follows:

A 500 cc., 3 necked flask is fitted with a stirrer, a reflux condenser, a nitrogen inlet, a thermometer and a heating mantle. The flask is then charged with MEK solvent and with the indicated monomers and the solvent-monomer mixture is stirred under a nitrogen blanket. After the monomers have dissolved in the solvent, the lithium chloride is added to the solution in the form of a saturated solution of lithium chloride in water and/or methanol. Then, the azobis isobutyronitrile catalyst is added and the contents of the flask are heated to a temperature of 80° C. with stirring, under a nitrogen blanket. Those conditions are maintained for a period of five (5) hours. At the end of that period, the contents of the flask are cooled to room temperature and are then transferred to an evaporating dish. The MEK solvent is then removed under a vacuum at 80° C., leaving the terpolymer product as a residue in the evaporating dish. The terpolymer product thereby recovered is a semi-liquid at 80° C. and a waxy solid at room temperature. In addition, the terpolymer product is verified to have a low molecular weight by virtue of having an inherent viscosity in acetone ($0.05 \pm 0.0002$ gram polymer in 20 ml acetone) of about 0.1 or less. Such inherent viscosity is determined based upon flow time of 20 ml of polymer solution and flow time of 20 ml of solvent (i.e., acetone) through an Ostwald viscometer and is calculated as follows:

$$\text{Inherent viscosity} = \log_n \frac{\text{Solution flow time}}{\text{Solvent flow time}} \div 0.25 \text{ gram polymer per 100 gram solvent}$$

The composition of the series of terpolymers prepared in the foregoing manner is summarized below:

| | | Polymer Composition[1] | | | | |
|---|---|---|---|---|---|---|
| | | Maleic | Vinylbenzyl ether | | | |
| Example | Styrene | Anhydride | Amount | R | $R_1$ | m |
| 1 (VBE-1) | 40 mole % | 50 mole % | 10 mole % | H | $CH_3$ | 10 |
| 2 (VBE-2) | " | " | " | " | " | 40 |
| 3 (VBE-3) | " | " | " | " | " | 100 |
| C-1 *(VBE-4) | " | " | " | " | nonyl-phenyl | 40 |
| C-2**(VBE-5) | " | " | " | " | " | 1 |

*Not an example of the invention by virtue of $R_1$ being nonylphenyl.
**Not an example of the invention by virtue of m being 1.
[1] Mole percent based on total monomers.

EXAMPLES 4-8

Dispersions of precipitated $CaCO_3$ (Purecal O brand from BASF Wyandotte) containing 70 percent solids and varying amounts of the interpolymer of Example 2 above are prepared by adding 200 grams of the dry precipitated calcium carbonate to 86 grams of water containing the desired amount of the interpolymer of Example 2 as the dispersant in the form of its neutralized (i.e., pH 7-8) sodium salt. The viscosity of the resulting dispersions are measured (initially and after a week of storage) with a Brookfield viscometer at 30 rpm using a #2 spindle for the low viscosities and a #3 spindle for the high viscosities.

A 70 percent solids dispersion employing a conventional dispersant (i.e., Calgon T) is similarly prepared and tested for the purpose of comparison.

The resulting dispersion viscosities are summarized below:

| Ex. No. | Dispersant | Amount of Dispersant* | Viscosity (cps) Initial | 1 Week at 70° F. |
|---|---|---|---|---|
| 4 | Na salt of Ex. 2 Polymer | 0.4% | >5,000 | >100,000 |
| 5 | Na salt of Ex. 2 Polymer | 0.45% | 260 | 350 |
| 6 | Na salt of Ex. 2 Polymer | 0.5% | 320 | 330 |
| 7 | Na salt of Ex. 2 Polymer | 0.6% | 360 | 260 |
| 8 | Na salt of Ex. 2 Polymer | 0.7% | 345 | 274 |
| C-3** | Calgon T[1] | 1.0% | 970 | Paste |

*Weight percent based upon dispersed solids.
**Not an example of the invention.
[1]Calgon T is a commercial grade of sodium hexametaphosphate in which part of the sodium has been replaced by other cations, predominantly zinc. It is conventionally used in making CaCO$_3$ pigmented coatings.

As is apparent from the foregoing results, the sodium salt of the interpolymer of Example 2 is a very effective dispersant for high solids aqueous dispersions of precipitated calcium carbonate. In particular, it is noted that such dispersant provides lower viscosity dispersions of precipitated calcium carbonate than does a substantially larger quantity of the conventionally employed dispersant (i.e., Calgon T). In addition, such dispersant is also observed to provide the dispersions with notably improved stability to storage relative to that of the conventionally employed dispersant.

EXAMPLES 9-11

The interpolymers of Examples 1-3 above are converted to their sodium salts by reaction in water with sodium hydroxide to a pH of about 7. The resulting interpolymer salts are then employed as dispersant (at 0.6 weight percent based upon the dispersed solids) in aqueous dispersions containing 70 parts by weight of precipitated calcium carbonate and 30 parts by weight of water and the viscosity of such dispersions is determined as in Examples 4-8.

In a similar fashion a 70 percent solids dispersion employing 0.6 weight percent (based on solids) of the sodium salt of comparative interpolymer C-2 of Examples 1-3 (i.e., having only one ethyleneoxide group in the methyl capped pendant chain) is prepared and tested for comparison. The viscosities of the various dispersions are presented below.

| Ex. No. | Polymer Dispersant | Number of Ethyleneoxide Repeating Units in the Vinylbenzyl Ether Monomer (i.e., m in Formula I) | Dispersion Viscosity cps |
|---|---|---|---|
| C-4* | Comparative Polymer, C-2[1] | 1* | Very thick |
| 9 | Example 1 | 10 | 4,800 |
| 10 | Example 2 | 40 | 950 |
| 11 | Example 3 | 100 | Too thick at 70% solids |

*Not an example of the invention.
[1]Low molecular weight (inherent viscosity of about 0.1) interpolymer of 40 mole percent styrene, 50 mole percent maleic anhydride and 10 mole percent of vinylbenzyl ether of Formula I having R=H, R$_1$=CH$_3$ and m=1.

The results for C-4 illustrate that the polymer employing the vinylbenzyl ether having only one ethyleneoxide group provides dispersions of very high viscosity at high solids content. In contrast, the interpolymers wherein the "m" values of Formula I are 10 and 40 (i.e., Examples 9 and 10, respectively) provide high solids aqueous dispersions of precipitated calcium carbonate having relatively low viscosity. Accordingly, those latter polymers are seen to be especially desirable as dispersants for high solids aqueous dispersions of precipitated calcium carbonate. Similar results are found when R$_1$ is ethyl, isopropyl or butyl.

In view of the foregoing results, the importance of having a plurality of ethyleneoxide repeating units in the pendant group of the vinylbenzyl ether monomer is clearly demonstrated.

The cause of the high viscosity in Example 11 is not certain. However, it is possible that vinylbenyl diethers of the ethylene glycol may have been formed during the vinylbenzl ether monomer preparation and that, accordingly, the resulting polymer employing that monomer may have become crosslinked. Alternatively, Example 11 may simply reflect that for large "m" values in the Formula I higher amounts of the interpolymer may be required to achieve adequate coverage of the particle surface with the interpolymer dispersant thereby obtaining optimum dispersing effectiveness.

EXAMPLE 12

This example illustrates that it is important for effective dispersing of precipitated calcium carbonate that the capping unit of the poly(ethyleneoxide) pendant group be lower alkyl.

The low molecular weight styrene/maleic anhydride/vinylbenzyl ether interpolymers of Example 2 and comparative polymer C-1 (from Examples 1-3) are each neutralized to pH 7 with NaOH and employed as aqueous dispersants in high solids aqueous dispersions of precipitated calcium carbonate pursuant to the procedure of Examples 4-8. In the Example 2 polymer, the pendant (ethyleneoxide) 40 chain of the vinylbenzyl ether monomer is capped with a methyl group (i.e., R$_1$ in the Formula I is methyl) and in the comparative polymer C-1 the vinylbenzyl ether pendant (ethyleneoxide) 40 group is capped with a nonylphenyl radical. In both cases, the vinylbenzyl ether pendant poly(oxyethylene) group has 40 oxyethylene repeating units. Also, in both cases the amount of dispersant employed is 0.7 weight percent based upon the precipitated calcium carbonate and both dispersions contain 70 weight percent precipitated calcium carbonate based upon the combined weight of the carbonate and the water.

The viscosity testing shows that the dispersion of Example 12 (i.e., employing the methyl capped interpolymer of Example 2) has a viscosity of 345 cps whereas the composition employing the nonylphenyl capped comparative interpolymer (i.e., interpolymer C-1 of Examples 1-3) will not disperse.

EXAMPLE 13

This example illustrates the effectiveness of the interpolymers of the invention as dispersants for more readily dispersed pigments and for coating compositions of such pigments containing the polymer latex as a film-forming binder component.

Three aqueous dispersions containing 70 weight percent kaolin clay on a total weight basis are prepared, respectively, using 0.15, 0.2 and 0.25 weight percent (based upon the clay) of the interpolymer of Example 2 as the dispersant.

For comparative purposes, two corresponding aqueous kaolin clay dispersions are prepared. In one instance 0.3 weight percent (based on the clay) of a conventional phosphate dispersant is employed and in the other instance 0.15 weight percent (based on the clay) of a conventional low molecular weight polyacrylate dispersant is employed.

The viscosities of the resulting dispersions are then measured pursuant to the procedure of Examples 4-8.

After determining the viscosities of the three kaolin clay dispersions, each of those dispersions is admixed with a styrene-butadiene copolymer latex (containing 50 percent polymer solids on a total weight basis) to form a paper coating composition. The respective viscosities of the resulting coating compositions are determined pursuant to the procedure of Examples 4-8.

The viscosity of the pigment dispersions (i.e., prior to the latex addition) containing the interpolymer of Example 2 are from about one and a half to about four times higher than the viscosity of the corresponding pigment dispersions employing the conventional dispersants. In contrast, however, the viscosity of the finished paper coating compositions (i.e., after addition of the latex binder) containing the interpolymer of Example 2 are less than the viscosity of the corresponding coating compositions employing the conventional dispersants.

The foregoing results indicate that the interpolymers of the invention are substantially more compatible with the latex coating system than are the phosphate or polyacrylate dispersants. Accordingly, the interpolymers of the invention appear to be particularly advantageous in pigmented coating compositions employing polymer latexes as film-forming binders for the pigments.

EXAMPLES 14 and 15

These examples compare the stability of dispersions (i.e., Examples 14 and 15) employing styrene/maleic anhydride/vinylbenzyl ether interpolymers of the invention to that of dispersions (i.e., C-5 and C-6) employing styrenemaleic anhydride copolymers having corresponding pendant poly(ethyleneoxide) groups attached through an ester linkage. The latter polymers are similar to those described in U.S. Pat. No. 3,392,155 and are prepared by reacting a low molecular weight (i.e., inherent viscosity=0.1) 1:1 mole ratio styrene/maleic anhydride (i.e., S/MA) copolymer with the monomethyl ether of a polyethylene glycol (having 10 or 40 ethyleneoxide repeating units) to form a partial ester of the S/MA copolymer. In such partial esters, 20 percent of the maleic anhydride repeating units are half esterified by the polyethylene glycol monomethyl ether. Accordingly, the number of pendant groups per polymer molecule is comparable to that of the polymers of the invention. The former polymers (i.e., those of the invention) are those of Examples 1 and 2.

The amount of dispersant employed in each of the dispersions is 0.6 percent based upon the solids weight and the pigment is precipitated calcium carbonate, employed at a 70 percent solids content on a total weight basis.

The aforementioned dispersions are each prepared pursuant to the procedure of Examples 9-11 and are each heat aged in a closed container in an oven at 60° C. for various storage intervals. The viscosity of each of the resulting dispersions is taken (after cooling to room temperature) after the various 60° C. storage periods using a Brookfield viscometer equipped with a No. 4 spindle and operated at 20 RPM.

The results, both for the dispersions employing the interpolymers of the invention and for the dispersions employing the comparative polymeric esters, are summarized below. In such results, the magnitude of any increase in dispersion viscosity upon storage provides a relative measure of storage stability of the subject dispersion. Specifically, relatively larger increases in viscosity over a given storage period indicates a relatively lesser degree of storage stability.

| Example No. | Number of Ethyleneoxide Repeating Units in the Pendant Chain | Linkage | Viscosity, cps Days of Storage at 60° C. | | | | | |
|---|---|---|---|---|---|---|---|---|
| | | | 0 | 10 | 20 | 30 | 40 | 80 |
| 14 | 10 | ether | 3300 | 3380 | 3300 | 3300 | 3380 | 3900 |
| C-5* | 10 | ester | 5500 | 9500 | | | | |
| 15 | 40 | ether | 450 | 450 | 450 | 450 | 420 | 580 |
| C-6* | 40 | ester | 580 | 600 | 1000 | 1600 | 2400 | >5000 |

*Not an example of the invention; the dispersant employed being a polymeric ester rather than an interpolymer of the invention.

As can be seen, the viscosities of the dispersions employing the interpolymers of the invention (i.e., Examples 14 and 15) remain relatively contant over 80 days of storage at 60° C. In contrast, the dispersions utilizing each of the comparative esterified S/MA copolymers (i.e., C-5 and C-6) undergo substantial viscosity increases upon storage at elevated temperature.

EXAMPLES 16 and 17

These examples, like Examples 14 and 15 above, also compare the stability of the interpolymers of the invention (specifically the polymers of Examples 1 and 2) with the stability of polymeric esters similar to those of U.S. Pat. No. 3,392,155. However, these examples differ from Examples 14 and 15 in that the heat aging is performed upon aqueous solutions of the polymers (i.e., prior to admixture with the CaCO₃) rather than after the complete dispersions have been formed.

In these examples, various aqueous solutions, each containing 10 weight percent (on a total weight basis) of the sodium salt of the chosen polymer, are heat aged in closed containers for various storage periods at 60° C. After the chosen storage interval, each aqueous polymer solution is cooled to room temperature and is used (at 0.6 weight percent polymer based on $CaCO_3$) to prepare an aqueous dispersion containing 60 weight percent (based on total dispersion weight) of precipitated $CaCO_3$.

The viscosity of each of the resulting dispersions is then measured using a Brookfield viscometer equipped with a No. 4 spindle and operated at 20 RPM. The viscosity results are summarized below. Again, increases in dispersion viscosity with increased periods of storage of the aqueous polymer solutions evidence relatively less storage stability for the polymer involved.

The polymers of the invention employed in Examples 16 and 17 are those of Examples 1 and 2, respectively. The comparative polymeric esters employed are similar to those of U.S. Pat. No. 3,392,155 and are prepared by reacting a low molecular weight (inherent viscosity $\approx 0.1$) 1:1 mole ration styrene/maleic anhydride (S/MA) copolymer with a monomethyl ether of a polyethylene glycol (having 10, 20 or 100 ethyleneoxide repeating units) to form a partial ester of the S/MA copolymer. In such partial esters, 20 percent of the maleic anhydride repeating units are half esterified by a polyethylene glycol monomethyl ether molecule such that the number of pendant groups per polymer molecule is comparable to that of the polymers of the invention.

| Example No. | Polymer Dispersant | Dispersion Viscosity, cps Days of Storage of the Polymer Solutions | | | | |
|---|---|---|---|---|---|---|
| | | 0 | 10 | 20 | 30 | 44 |
| 16 | VBE 1[1] | 800 | 800 | 800 | 800 | 800 |
| 17 | VBE 2[1] | 90 | 90 | 90 | 100 | 100 |
| C-16* | S/MA Ester #1 | 400 | 1,000 | 1,480 | 1,700 | 1,810 |
| C-17* | S/MA Ester #2 | 150 | 480 | 870 | 1,310 | 1,800 |
| C-18* | S/MA Ester #3 | 2,750 | 3,000 | 3,600 | 4,400 | — |

*Not an example of the invention since the dispersant employed is a polymeric ester rather than a terpolymer of the invention.
[1]See Examples 1-3 for polymer composition.
S/MA Ester #1 is S/MA copolymer half esterified with 29 weight percent (based on S/MA) of
$CH_3\text{---}(O\text{---}CH_2\text{---}CH_2)_{10}\text{---}OH$.
S/MA Ester #2 is S/MA copolymer half esterified with 58 weight percent (based on S/MA) of
$CH_3\text{---}(O\text{---}CH_2\text{---}CH_2)_{20}\text{---}OH$.
S/MA Ester #3 is S/MA copolymer half esterified with 253 weight percent (based on S/MA) of
$CH_3\text{---}(O\text{---}CH_2\text{---}CH_2)_{100}\text{---}OH$.

As can be seen from the foregoing results, the viscosity of dispersions employing the interpolymers of the invention are substantially unchanged by varying degrees of heat aging of such polymers prior to their use in the dispersions. In contrast, however, the dispersions employing the polymeric ester dispersants (i.e., C-16 through C-18) are observed to be adversely affected by heat aging of the aqueous solutions of such dispersants.

EXAMPLES 18-20

These examples illustrate the use of the interpolymers of the invention as protective colloids for emulsions of synthetic polymers (i.e., as protective colloids for synthetic polymer latexes).

Pursuant to the procedure of Examples 1-3 a low molecular weight terpolymer (i.e., inherent viscosity of about 0.1) is prepared containing 40 mole percent styrene, 50 mole percent maleic anhydride and 10 mole percent of a vinylbenzyl ether of the Formula I above having $R=H$, $R_1=CH_3$ and $m=40$.

In a similar fashion, low molecular weight terpolymers such as are described in U.S. Pat. No. 4,025,484 (specifically having a nonylphenyl or a $C_{18}$ alkyl $R_1$ group on the Formula I vinylbenzyl ether monomer and containing either 1 to 10 mole percent of such monomer), are prepared for comparison.

In addition, relatively higher molecular weight terpolymers, such as are described in U.S. Pat. Nos. 3,794,608 and 4,008,202 as aqueous thickening agents (specifically having a nonylphenyl $R_1$ group on the Formula I vinylbenzyl ether monomer and having varying amounts of such monomer therein), are similarly prepared for comparison.

The foregoing terpolymers are then converted to either their sodium or ammonium salts (by neutralization to pH 7-8 with sodium or ammonium hydroxide, respectively) and those salts are then employed as protective colloids in a series of aqueous 85/15 weight ratio vinyl acetate/2-ethylhexyl acrylate copolymer emulsions prepared pursuant to the procedure of Example 1(B) of U.S. Pat. No. 3,819,593. In addition, a corresponding comparative emulsion is prepared in the same fashion employing a conventional protective colloid (i.e., hydroxyethyl cellulose). The pH of each of the resulting emulsions is in the range of 4.5 to 5.0, the percent conversion in each case is in the range of 97.8 to 99.9, the mechanical stability is good in each case and the particle size is in the range of 0.4 to 0.43 micron.

Each of the resulting aqueous copolymer emulsions are then subjected to the following testing procedures and the results are summarized in Table I below.

Coagulum: Following polymerization and cooling to room temperature, the copolymer emulsion is passed through a 60 mesh screen. The material retained on the screen is recorded as coagulum.

Freeze-Thaw Stability: Freeze-thaw stability is tested by placing 100-200 grams of the emulsion in a paint can and storing in a freezer at 0° C. for 18-22 hours. If the emulsion reforms upon thawing, the procedure is repeated until the emulsion falls or until it passes a total of five cycles.

Mechanical Stability: Mechanical stability is tested using a Hamilton-Beach milkshake mixer. A 100-200 gram portion of emulsion is agitated until the emulsion coagulates, or for a total of 30 minutes.

Water Sensitivity: 10 mil films of the emulsions are cast on clear ETHOCEL ® sheets to check for film clarity and water resistance. Resistance to water is measured by observing the relative opaqueness of the film after a drop of water has resided on the film surface for 30 seconds.

Viscosity: Viscosity of the emulsion is measured using a Brookfield RVT viscometer. Heat age stability of the emulsion is tested in an oven for one week at 140° F. The viscosity is again measured and observations made of any physical settling or separation.

Latex Grit: Latex grit is tested by passing the cooled latex through a 200-mesh screen.

TABLE I

| Example No. | Protective Colloid Type | Protective Colloid Amount[1] | Percent Polymer Solids | Coagulum (g/1000g Latex) | Grit (g/1000g Latex) | Viscosity(cps) Initial | Viscosity(cps) 1 week at 140° F. | Freeze-Thaw Stability (Cycles) | Film Clarity | Water Sensitivity |
|---|---|---|---|---|---|---|---|---|---|---|
| 18 | A | 0.25% | ~45% | 0.08 | 0.02 | 32 | 30 | 1 | Exc. | Exc.— |
| 19 | A | 0.25% | ~60% | 0.6 | 0.38 | 64 | 68 | 0 | Good | Good |
| 20 | B | 0.5 % | ~45% | 0.48 | 0.1 | 53 | 48 | 5 | Exc. | Exc.— |
| C-7* | C | 0.5 % | ~45% | 0.42 | 0.05 | 270 | 177 | 5 | Exc. | Fair |
| C-8* | D | 0.5 % | ~45% | 0.1 | <0.1 | 236 | 166 | 0 | Exc. | Exc.— |
| C-9* | E | 0.5 % | ~45% | 0.22 | 0.3 | 504 | 518 | 5 | Fair | Fair |
| C-10* | F | 0.5 % | ~45% | 0.16 | <0.1 | 216 | 152 | 4 | Exc. | Fair |
| C-11* | G | 1.25% | ~45% | — | — | 70,400 | 23,680 | 5 | Exc. | Poor |
| C-12* | H | 1.25% | ~45% | 0.6 | — | 5,850 | 2,432 | 5 | Good+ | Poor |
| C-13* | HEC | 0.5 % | ~45% | 0.1 | 0.1 | 138 | 115 | 0 | Exc. | Exc.— |

*Not an example of the invention.
[1]Weight percent based upon total vinylacetate and 2-ethylhexyl acrylate monomer.
[2]Weight percent on total weight basis.
A $NH_3$ salt of 40/50/10 mole ratio styrene/maleic annydride/vinylbenzyl ether (R=H, $R_1$=$CH_3$ and m=40) terpolymer.
B Same as A except it is the sodium salt rather than the $NH_3$ salt.
C $NH_3$ salt of 49/50/1 mole ratio styrene/maleic anhydride/vinylbenzyl ether (R=H, $R_1$=nonylphenyl and m=40) terpolymer having inherent viscosity=0.135. (Similar to those of U.S. Pat. No. 4,025,484.)
D Same as C except that inherent viscosity = 0.093. (Similar to U.S. Pat. No. 4,025,484.)
E Na salt of 40/50/10 mole ratio styrene/maleic anhydride/vinylbenzyl ether (R=H, $R_1$=$C_{18}$ alkyl and m=40) terpolymer. (Similar to U.S. Pat. No. 4,025,484.)
F Na Salt of 49/50/1 mole ratio styrene/maleic anhydride/vinylbenzyl ether (R=H, $R_1$=nonylphenyl and m=40) terpolymer. (Similar to U.S. Pat. No. 4,025,484.)
G Na salt of 47.5/50/2.5 mole ratio styrene/maleic anhydride/vinylbenzyl ether (R=H, $R_1$=nonylphenyl and m=40) thickener such as those of U.S. Pat. No. 3,904,608 and 4,008,202.
H Na salt of 49/50/0.85/0.15 mole ratio styrene/maleic anhydride/vinylbenzyl ether (R=H, $R_1$=nonylphenyl and m=40)/vinylbenzyl ether (R=H, $R_1$=$C_{18}$ alkyl, and m=40) interpolymer thickener. (Similar to U.S. Pat. No. 3,794,608 and 4,008,202.)
HEC Conventional hydroxyethyl cellulose protective colloid.

As is apparent from the foregoing results for Examples 18–20, the interpolymers of the invention are effective protective colloids for the polymer dispersions even at the high polymer solids content of Example 19. In addition, the interpolymers are observed to be especially beneficial in that they provide polymer dispersions having notably lower viscosities than those dispersions employing either the conventional hydroxyethyl cellulose protective colloid of the comparative styrene/maleic anhydride/vinylbenzyl ether terpolymers which are outside the scope of the instant invention.

While the present invention has been described with reference to various embodiments and examples thereof, such examples and embodiments are not meant to limit in any way the scope of the instantly claimed invention.

What is claimed is:

1. A low molecular weight interpolymer which is at least inherently water-dispersible and which comprises, in polymerized from and based upon the total moles of monomer,
    (a) from about 1 to about 25 mole percent of an alkenyl benzyl ether monomer having the formula:

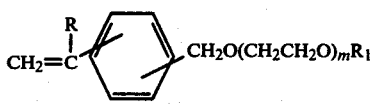

where R is hydrogen or methyl, $R_1$ is a lower alkyl group and m is a positive integer of from about 10 to about 100;
    (b) from about 20 to about 60 mole percent of a copolymerizable ethylenically unsaturated carboxylic acid monomer or a copolymerizable ethylenically unsaturated dicarboxylic anhydride monomer; and
    (c) from about 25 to about 75 mole percent of a hydrophobic monomer.

2. The interpolymer of claim 1 wherein the molecular weight is from about 1,000 to about 10,000.

3. The interpolymer of claim 1 wherein R is hydrogen.

4. The interpolymer of claim 1 wherein $R_1$ is methyl.

5. The interpolymer of claim 1 wherein m is from about 20 to about 40.

6. The interpolymer of claim 1 wherein the acid or anhydride monomer is maleic anhydride.

7. The interpolymer of claim 6 wherein the hydrophobic monomer is styrene.

8. The interpolymer of claim 1
    (A) which comprises:
        (a) from about 5 to about 25 mole percent of the alkenyl benzyl ether monomer;
        (b) from about 30 to about 50 mole percent of the unsaturated acid or anhydride monomer; and
        (c) from about 30 to about 60 mole percent of the hydrophobic monomer, all based upon the total moles of monomer in the polymer; and
    (B) wherein, in the alkenyl benzyl ether monomer, the value of the integer m is from about 10 to about 40.

9. The interpolymer of claim 1 which comprises from about 5 to about 25 mole percent of the alkenyl benzyl ether monomer on a total mole basis.

10. An aqueous dispersion of water-insoluble organic or inorganic particulate matter containing an amount of the interpolymer of claim 1 which is sufficient to stabilize the dispersion.

11. The aqueous dispersion of claim 10 wherein the particulate matter comprises a film-forming natural or synthetic polymer particle.

12. The aqueous dispersion of claim 10 wherein the particulate matter comprises finely divided inorganic solids.

* * * * *

UNITED STATES PATENT AND TRADEMARK OFFICE
CERTIFICATE OF CORRECTION

PATENT NO. : 4,151,341

DATED : April 24, 1979

INVENTOR(S) : Robert H. Lalk; Syamalarao Evani

It is certified that error appears in the above-identified patent and that said Letters Patent are hereby corrected as shown below:

Column 2, line 38, delete "contaning" and insert --containing--.

Column 3, line 9, delete "of" and insert --in--.

Column 3, line 22, delete "αmethyl-sty-" and insert -- α-methyl-sty- --.

Column 3, line 40, delete "also can" and insert --can also--.

Column 9, line 8, delete "the" and insert --a--.

Column 10, line 50, delete "contant" and insert --constant--.
Column 12, line 13, delete "to" and insert --or--.
Column 12, line 49, delete "falls" and insert --fails--.

Column 13, Table I, third column heading, delete "Solids" and insert --Solids[2]--.

Column 13, Table I, in the footnotes, line 4, delete "annydride/vinylbenzyl" and insert --anhydride/vinylbenzyl--.

Column 13, line 39, delete "of" and insert --or--.

UNITED STATES PATENT AND TRADEMARK OFFICE
CERTIFICATE OF CORRECTION

PATENT NO. : 4,151,341
DATED : April 24, 1979
INVENTOR(S) : Robert H. Lalk; Syamalarao Evani It is certified that error appears in the above-identified patent and that said Letters Patent are hereby corrected as shown below:

Column 13, line 50, delete "from" and insert --form--.

Signed and Sealed this

Sixth Day of November 1979

[SEAL]

Attest:

RUTH C. MASON
*Attesting Officer*

LUTRELLE F. PARKER
*Acting Commissioner of Patents and Trademarks*